United States Patent [19]

Brückner et al.

[11] Patent Number: 5,472,640
[45] Date of Patent: Dec. 5, 1995

[54] CONDUCTIVE LAMELLAR PIGMENTS

[75] Inventors: Hans D. Brückner; Reiner Esselborn, both of Darmstadt, Germany

[73] Assignee: Merck Patent Gesellschaft mit Beschrankter Haftung, Darmstadt, Germany

[21] Appl. No.: 231,090

[22] Filed: Apr. 22, 1994

Related U.S. Application Data

[63] Continuation of Ser. No. 450,801, Dec. 14, 1989, abandoned.

[30] Foreign Application Priority Data

Dec. 16, 1988 [DE] Germany ............... 38 42 330.8

[51] Int. Cl.$^6$ ............... H01B 1/00; H01B 1/06; H01B 1/08
[52] U.S. Cl. ............... 252/518; 252/519; 252/520; 106/903; 106/415; 106/417; 106/418; 106/482; 106/483; 428/651; 428/402.24; 428/403
[58] Field of Search ............... 252/512, 513, 252/518, 519, 520; 106/903, 415, 417, 418, 482, 483; 428/651, 402.24, 403

[56] References Cited

U.S. PATENT DOCUMENTS

| | | | |
|---|---|---|---|
| 3,438,796 | 4/1969 | Hanke | 106/291 |
| 4,435,220 | 3/1984 | Watanabe et al. | 106/415 |
| 4,494,993 | 1/1985 | Bernhard et al. | 106/291 |
| 4,772,331 | 9/1988 | Noguchi et al. | 106/415 |
| 4,867,793 | 9/1989 | Franz et al. | 106/415 |
| 4,917,952 | 4/1990 | Katamoto et al. | 252/519 |
| 5,068,063 | 11/1991 | Tremper, III | 252/518 |
| 5,104,583 | 4/1992 | Richardson | 252/518 |
| 5,236,737 | 8/1993 | Linton | 252/518 |

FOREIGN PATENT DOCUMENTS

| | | |
|---|---|---|
| 068311 | 1/1983 | European Pat. Off. . |
| 139557 | 5/1985 | European Pat. Off. . |
| 220509 | 9/1986 | European Pat. Off. . |
| 265820 | 5/1988 | European Pat. Off. . |
| 307771 | 3/1989 | European Pat. Off. . |

Primary Examiner—Paul Lieberman
Assistant Examiner—M. Kopec
Attorney, Agent, or Firm—Millen, White, Zelano, & Branigan

[57] ABSTRACT

The application relates to conductive lamellar pigments in which lamellar substrate is coated with an electrically conductive layer, characterized in that a lamellar metal oxide or a lamellar material coated with one or more metal oxides is present as the lamellar substrate and that an optionally hydrated silicon dioxide layer or a layer of another insoluble silicate is arranged between the metal oxide layer and the conductive layer.

17 Claims, No Drawings

CONDUCTIVE LAMELLAR PIGMENTS

This application is continuation of application Ser. No. 07/450,801, filed Dec. 14, 1989, now abandoned.

The invention relates to conductive lamellar pigments, in which a lamellar substrate is coated with an electrically conductive layer.

BACKGROUND OF THE INVENTION

In many branches of industry there is a need for conductive pigments, with which, for example, plastics, paints, coatings, fibers or similar materials can be produced which are electrically conductive, antistatic or act as a shield against electromagnetic waves. Conductive carbon black is used in large quantities for this purpose, but because of its high light absorption this cannot be used for light or colored coatings.

Additionally, a number of metals and oxide type materials, such as, for example, tin dioxide doped with antimony or indium oxide doped with tin, are also known which can be used as such or used as a coating on other pigments or extenders. Apart from conductivity, only black or gray color shades or metallic effects can be achieved with the majority of known pigments. Some of the known pigments are also not stable to temperature changes or resistant to weathering. EP-A 139,557 also discloses the provision of transparent lamellar substrates, such as for example, mica or glass, with a conductive layer. The pigments obtained in this way are, however, not opacifying and are therefore not suitable for the production of decorative coatings.

There is therefore a need for stable electrically conductive pigments, which are opacifying light or even colored and, apart from conductivity, impart a decorative appearance to the coatings or plastics.

SUMMARY OF THE INVENTION

It has now been found that lamellar special effect pigments such as, for example, mica flakes coated with metal oxides or also carrier-free lamellar metal oxides, in particular iron oxides, can be provided with a conductive layer. However, the decorative pigments obtained in this manner have conductivities which are not sufficiently high for all uses. Surprisingly, it has been found, however, that the conductivity can be drastically increased if the starting pigment is first covered with an optionally hydrated silicon dioxide layer before the conductive layer is applied.

The invention therefore relates to conductive lamellar pigments, in which a lamellar substrate is coated with an electrically conductive layer, characterized in that a lamellar metal oxide or a lamellar material coated with one or more metal oxides is present as the lamellar substrate and that an optionally hydrated silicon dioxide layer or a layer of another insoluble silicate is arranged between the metal oxide layer and the conductive layer.

The invention also relates to a process for the manufacture of conductive lamellar pigments, in which a lamellar substrate is coated with an electrically conductive layer, characterized in that a lamellar metal oxide or a lamellar material coated with one or more metal oxides is used as the lamellar substrate and this lamellar substrate is coated with an optionally hydrated silicon dioxide layer or a layer of another insoluble silicate before being coated with the conductive layer.

In principle all lamellar special effect pigments, such as, for example, lamellar iron oxide, bismuth oxychloride or lamellar materials coated with colored or colorless metal oxides, such as, for example, natural or synthetic micas, other laminated silicates such as talc, kaolin or sericite or glass platelets can be used as lamellar substrates. All these pigments are known and commercially available or can be produced using known methods.

Mica flakes coated with metal oxides such as are disclosed, for example in U.S. Pat. Nos. 3,087,828 and 3,087,829 are particularly preferred as substrates. Metal oxides used in this process are both colorless, highly refractive metal oxides, such as, in particular, titanium dioxide and/or zirconium dioxide, as well as colored metal oxides, such as, for example, chromium oxide, nickel oxide, copper oxide, cobalt oxide and in particular iron oxides, such as, for example, $Fe_2O_3$ or $Fe_3O_4$, or mixtures of such metal oxides. Such metal oxide/mica pigments are commercially available under the tradenames Afflair® and Iriodin®.

In addition, in particular lamellar iron oxides such as, for example, are disclosed in EP-A 14,382, 68,311, 265,820, 268,072 and 283,852 are also particularly preferred as lamellar substrates.

According to the invention these substrates are coated with an optionally hydrated silica layer or with a layer of another insoluble silicate such as, for example, aluminum silicate. For this purpose the substrate is suspended in water and the solution of a soluble silicate and where appropriate of a metal salt is added, preferably at elevated temperature and a suitable pH value, the pH value being maintained in the suitable range by the simultaneous addition of acid, such as, for example, hydrochloric acid or sulfuric acid, if necessary. In principle any soluble silicate can be used as the silicate. However, sodium silicate is preferred because of its ready availability, its favorable price and its high purity.

The precipitation of silicate is preferably effected in a weakly acid or alkaline medium, i.e., in a pH range of preferably about 11–11.5. In this context it has proved simplest to adjust the pH to the suitable value by adding silicate solution and to maintain it at this value during the further metering-in of silicate by adding acid at the same time.

The silica layer applied in this way should make up at least 5% by weight of the pigment, calculated as $SiO_2$ and relative to the substrate. In principle there are no upper limits, but it is found that no further increase in conductivity can be achieved by very thick $SiO_2$ layers. Silica layers of about 5–20% by weight, in particular about 10%, are therefore preferred.

The silica-coated substrate can be removed from the suspension and where appropriate washed, dried and heat treated at a temperature of up to 1000° C. before the subsequent coating with the conductive layer. However, it is also possible to carry out the coating with the conductive layer directly after the silica coating, without prior removal of the pigment from the suspension. Since the coating with silica can also be carried out directly after the manufacture of the lamellar substrate, for example after the coating of a lamellar material such as mica or glass with metal oxides, a particularly advantageous procedure is thus possible using a one-pot process. Surprisingly it was found here that the pigments produced in the one-pot process often have an even better conductivity.

The application of the conductive layer is effected in a manner known per se, for example in accordance with the process describe in EP-A 139,557. All conventional conductive metal oxides or mixtures of metal oxides can be used for this application. A selection of such materials is given in EP-A 139,557 on page 5, lines 5–19. However, a conductive layer of tin dioxide doped with antimony is preferred, which is applied to the lamellar substrate in an amount of about 25–100% by weight relative to the lamellar substrate and in particular in an amount of about 50–75% by weight. Larger quantities are indeed also possible in principle, but no further increase in conductivity is achieved and the pigments become increasingly darker.

A tin/antimony ratio of about 2:1 to 20:1, preferably of about 5:1 to about 10:1 is preferably maintained in the coating. High conductivities are not achievable if the antimony content is too low, while the pigments become increasingly darker at a higher antimony content.

The desired homogeneous distribution of tin and antimony in the conductive layer is achieved without problems in that the salts of tin and antimony, for example the chlorides, are metered continually and in a predetermined mixture ratio into the aqueous suspension of the silica-coated substrate, either jointly in one solution or in two separate solutions at a suitable pH value of about 1 to 5 and a suitable temperature of about 50° to 90° C. at a rate such that in each case a hydrolysis and deposition on the lamellar substrate takes place immediately.

On completion of the coating, the pigments are removed from the suspension, where appropriate washed and dried and as a rule heat-treated at temperatures in the range of about 300°–900° C. Depending on the starting material chosen, the conductive pigments according to the invention are silver-colored white or possess a powder color and/or interference color. The size of the pigments according to the invention is also determined by the choice of the starting material and as a rule is chosen in a range of about 1–200 μm, particularly about 5–100 μm.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application Federal Republic of Germany P 38 42 330.8, filed Dec. 16, 1988, are hereby incorporated by reference.

EXAMPLES

Example 1 a) Coating with silicon dioxide 100 g of a titanium dioxide/mica pigment with a silvery interference color and a particle size of 10–60 μm (Iriodin® 100 from E. Merck, Darmstadt; 27% TiO$_2$, 73% mica) are suspended in 2000 ml of water, the suspension is heated to 60° C. and 1000 ml of a sodium waterglass solution (10 g SiO$_2$ per liter) are added continuously in the course of 4 hours, with stirring, the pH value being kept constant at 9.0 using 2% sulfuric acid. After completion of the addition, the suspension is stirred for a further hour and the solid material is filtered off, washed, dried at 100° C. and heat-treated for 30 minutes at 800° C.

b) Coating with tin/antimony oxide

A solution of 98.5 g SnCl$_4$.5H$_2$O and 11.3 g SbCl$_3$ in 200 ml 32% hydrochloric acid is diluted to 1000 ml with water and added in the course of 5 hours to the suspension, which has been warmed to 75° C. of the SiO$_2$ coated pigment according to Example 1a in 2000 ml of water, the pH value being kept constant at 1.6 using 32% sodium hydroxide solution. The solid material is then filtered off, washed with about 20 l chloride-free water, dried at 110° C. and heat treated for 30 minutes at 800° C. A light-colored pigment with a golden interference color is obtained having the composition: 45.6% mica, 16.9% TiO$_2$, 6.25% SiO$_2$, 31.25% tin/antimony oxide and a tin/antimony ratio of 85:15. The quantity of the SiO$_2$ intermediate layer, relative to the substrate, is 10% and the amount of the conductive layer, relative to the substrate, is 50%. The specific resistance of the pigment is 20 Ohm·centimeter, measured in the following measuring equipment:

Using two metal pistons about 0.5 g of pigment is compressed in an acrylic glass tube with an internal diameter of d=1 cm and the electrical resistance R produced between these metal pistons is measured. The specific resistance ρ is obtained from the thickness L of the compressed pigments using the equation $$\rho = R \cdot \frac{(d/2)^2}{L} \ [\text{Ohm} \cdot \text{cm}]$$

Example 2 (comparative example)

100 g of the titanium dioxide/mica pigment from Example 1 are coated as described in Example 1b with tin/antimony oxide, but without the SiO$_2$ intermediate layer previously having been applied according to Example 1a. A light-colored pigment with a golden interference color and a specific resistance of 500 Ohm·centimeter is obtained.

Example 3

100 g of a titanium dioxide/mica pigment with a blue interference color and a particle size of 10–60 μm (Iriodin® 225 from E. Merck, Darmstadt; 52% TiO$_2$, 48% mica) are coated in accordance with Example 1 with SiO$_2$ and then coated with tin/antimony oxide. A light-colored pigment with a bright green interference color and a specific resistance of 25 Ohm·centimeter is obtained.

Example 4 (comparative example)

The procedure is analogous to Example 3, but without application of the SiO$_2$ layer. A light-colored pigment with a green interference color and a specific resistance of 600 Ohm·centimeter is obtained.

Example 5

100 g of a mica pigment coated with iron oxide and having a particle size of 10–60 μm (Iriodin® 500 from E. Merck, Darmstadt; 45% Fe$_2$O$_3$, 66% mica) are coated as described in Example 1 with SiO$_2$ and tin/antimony oxide. A bronze-colored interference pigment with excellent coloring power and a specific resistance of 20 Ohm·centimeter is obtained.

Example 6 (comparative example)

The procedure is analogous to Example 5, but without application of the $SiO_2$ intermediate layer. A bronze-colored interference pigment with good covering power and a specific resistance of about $1\cdot 10^6$ Ohm·centimeter is obtained.

Example 7

318 ml of an 18% aqueous solution of titanium tetrachloride are added continuously in the course of one hour to a suspension, which has been warmed to 75° C., of 100 g muscovite mica with a particle size of 1–15 μm in 2000 ml water, the pH value being kept constant at 2.2 using 32% sodium hydroxide solution. After stirring for a further 30 minutes the pH value is increased to 9.0 and a $SiO_2$ layer is deposited in accordance with Example 1a. Analogously to Example 1b, but using 147.8 g $SnCl_4\cdot 5\ H_2O$ and 17.0 g $SbCl_3$ a tin/antimony oxide layer is then applied. A pigment with the composition 46.5% mica, 14% $TiO_2$, 4.6% $SiO_2$ and 34.9% tin/antimony oxide is obtained. The $SiO_2$ content, relative to the mica/$TiO_2$ substrate, is 7.7% and the tin/antimony oxide content, relative to the substrate, is 57.7%. The pigment has a light gray color, good covering power and a specific resistance of 35 Ohm·centimeter.

Example 8

The procedure is analogous to Example 7, but the silica-coated pigment is not separated off, washed, dried and heat-treated, but is coated further with tin/antimony oxide directly in the suspension. A pigment of the same composition with a specific resistance of 17 Ohm·centimeter is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A conductive lamellar pigment comprising:
   a) a metal oxide-coated lamellar substrate
   b) a conductive layer; and
   c) between (a) and (b) a layer of an insoluble silicate.

2. A pigment according to claim 1, wherein the metal oxide-coated lamellar substrate is a laminated silicate or a glass platelet.

3. A pigment according to claim 2, wherein the metal oxide-coated lamellar substrate is talc, kaolin or sericite.

4. A pigment according to claim 1, wherein the metal oxide-coated lamellar substrate is mica.

5. A pigment according to claim 1, wherein the insoluble silicate is optionally hydrated silicon dioxide.

6. A pigment according to claim 1, wherein the insoluble silicate is aluminum silicate.

7. A pigment according to claim 1, wherein the insoluble silicate is present in an amount of about 5–20% by weight relative to (a).

8. A pigment according to claim 1, wherein the insoluble silicate is present in an amount of about 5–20% by weight relative to (a).

9. A pigment according to claim 1, wherein the conductive layer is tin dioxide doped with antimony.

10. A pigment according to claim 2, wherein the metal oxide is titanium dioxide, zirconium dioxide, chromium oxide, nickel oxide, copper oxide, cobalt oxide, iron(II) oxide, iron(III) oxide or a mixture thereof.

11. A pigment according to claim 1 which is silver-white or has an interference color.

12. A pigment according to claim 1 having a specific resistance of about 20–35 Ω·cm.

13. A pigment according to claim 1 prepared by a process wherein the electroconductive layer is precipitated in a strongly acidic medium.

14. A pigment according to claim 13, prepared by a process wherein the electroconductive layer is precipitated at a pH of about 1–5.

15. A pigment according to claim 14, wherein the silicate layer is precipitated at a pH of about 6–11.5.

16. A pigment according to claim 9, wherein the ratio of tin to antimony is about 2:1 to 20:1.

17. A pigment according to claim 9, wherein the ratio of tin to antimony is about 5:1 to 10:1.

* * * * *